United States Patent
Sawada

[19]

[11] Patent Number: 5,961,188
[45] Date of Patent: Oct. 5, 1999

[54] BRAKE APPARATUS FOR A VEHICLE

[75] Inventor: Mamoru Sawada, Yokkaichi, Japan

[73] Assignee: Denso Corporation, Kariya, Japan

[21] Appl. No.: 08/845,905

[22] Filed: Apr. 28, 1997

[30] Foreign Application Priority Data

Apr. 26, 1996 [JP] Japan ................................. 8-108280

[51] Int. Cl.[6] .................................................. B60T 8/32
[52] U.S. Cl. ................................ 303/113.5; 303/116.1
[58] Field of Search ........................... 303/113.5, 115.4,
303/116.1, 119.2, 146, 155, 186–188; 364/426.015,
426.023; 701/38

[56] References Cited

U.S. PATENT DOCUMENTS

| 4,585,281 | 4/1986 | Schnurer . | |
|---|---|---|---|
| 5,131,729 | 7/1992 | Wetzel | 303/113.5 |
| 5,281,012 | 1/1994 | Binder et al. | 303/113.5 |
| 5,452,947 | 9/1995 | Ehmer et al. . | |
| 5,492,394 | 2/1996 | Kusano et al. | 303/113.5 |
| 5,531,514 | 7/1996 | Nishii et al. | 303/116.1 |
| 5,538,334 | 7/1996 | Kushi et al. . | |
| 5,558,415 | 9/1996 | Buschmann et al. . | |
| 5,584,540 | 12/1996 | Takeuchi et al. | 303/116.1 |
| 5,624,164 | 4/1997 | Tozu et al. | 303/9.62 |
| 5,673,979 | 10/1997 | Kuromitsu et al. | 303/116.1 |
| 5,725,289 | 3/1998 | Mueller et al. | 303/119.2 |
| 5,732,371 | 3/1998 | Fujita | 701/38 |
| 5,890,776 | 4/1999 | Sawada | 303/113.5 |

FOREIGN PATENT DOCUMENTS

| 3410083 | 10/1984 | Germany . |
|---|---|---|
| 4116009 | 11/1992 | Germany . |
| 4116373 | 11/1992 | Germany . |
| 4224971 | 2/1994 | Germany . |
| 5-147517 | 6/1993 | Japan . |
| 7-506551 | 7/1995 | Japan . |

Primary Examiner—Chris Schwartz
Attorney, Agent, or Firm—Pillsbury Madison & Sutro LLP

[57] ABSTRACT

A brake apparatus for a vehicle that increases brake-fluid pressure at a wheel or wheels whereat adjustment of brake-fluid pressure by the brake-fluid pressure adjusting device has not yet been initiated, at a time when braking control, i.e., adjustment of brake-fluid pressure by a brake fluid pressure adjusting device, is initiated at a wheel. Consequently, braking force of the wheels not under braking control is increased without additional braking operation by the driver, and substantially maximum braking force can be exhibited at the wheels not under braking control.

8 Claims, 8 Drawing Sheets

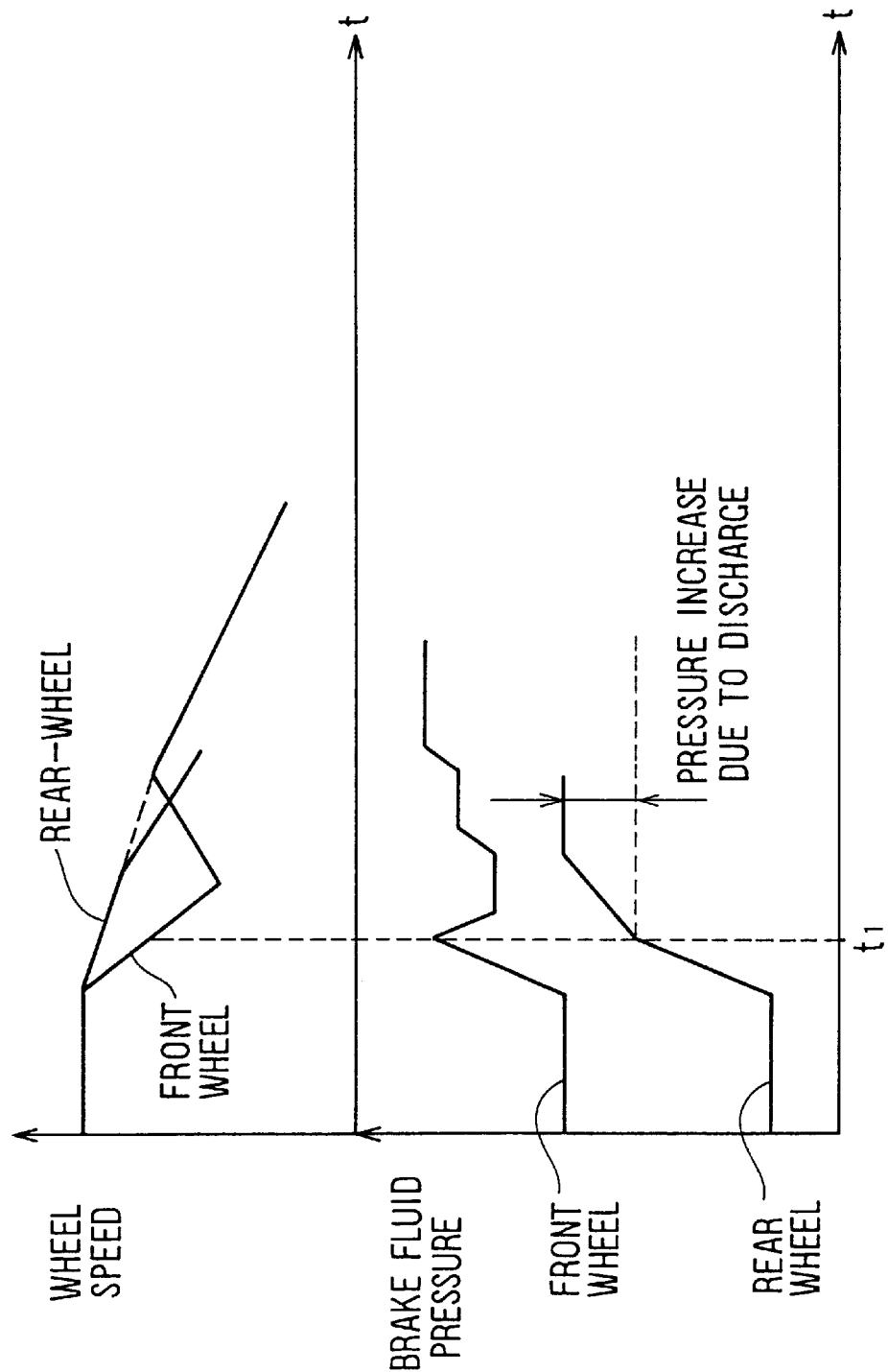

BRAKE APPARATUS FOR A VEHICLE

CROSS REFERENCE TO RELATED APPLICATION

This application based upon and claims the benefit of priority of the prior Japanese Patent Application No. 8-108280 filed on Apr. 26, 1997, the contents of which are incorporated herein by reference.

BACKGROUND OF THE INVENTION

1. Field of the Invention

The present invention relates to a vehicle brake apparatus, and more particularly, to a vehicle brake apparatus that distributes braking force to a plurality of wheels during braking.

2. Related Art

In a conventional vehicle antiskid, or antilock, braking system, the braking force applied to respective wheels of a vehicle is regulated so that the front wheels lock first to ensure stability of the vehicle body during braking. For example, front-wheel and rear-wheel braking force is ordinarily distributed so that front-wheel braking force transversely intersects a front-wheel lock-limit line without the rear-wheel braking force intersecting a rear-wheel lock-limit line, as indicated by the solid line in the graph shown in FIG. 10.

Consequently, during antiskid control, brake-fluid pressure of several wheels is regulated based on a road-surface friction limit (also termed a lock limit: a friction limit of the wheel and road surface whereat greater friction force cannot be obtained). By regulating the brake-fluid pressure in this manner, braking is optimally controlled when a road-surface friction limit is reached, or when the road-surface friction limit is approached in accompaniment with a braking operation performed by a driver, by initially braking the front wheels under antiskid control.

However, after the front wheels have entered antiskid control, the driver must depress the brake pedal until rear-wheel braking force reaches a point Em at which maximum braking force of the rear wheels is substantially demonstrated. For this reason, as shown in FIG. 11, not only considerable pedal-depression force becomes necessary, but also deceleration G does not increase in proportion to the depression force. Deceleration G is gradually increased due to an increase in rear-wheel braking force, and large deceleration G is rarely obtained. As a result, a relatively long time is required until a maximum braking force is reached for all wheels, thereby resulting in less-than-optimal braking performance.

SUMMARY OF THE INVENTION

It is an object of the present invention to provide a vehicle brake apparatus that rapidly increases braking force and enhances braking performance.

The present invention increases brake-fluid pressure at a wheel whereat brake-fluid pressure has not yet been adjusted at a time when adjustment of brake-fluid pressure is initiated with respect to any wheel.

As a result, as shown in FIG. 3, braking force is increased to a point BM, and maximum braking force can be exhibited rapidly with respect to the other wheels not initially under antiskid control (in FIG. 3, the rear wheels). Consequently, braking force is promptly increased and braking performance is enhanced.

More specifically, the vehicle brake apparatus of the present invention includes a brake-fluid pressure generating device to generate brake-fluid pressure corresponding to a driver-initiated brake operation. A first wheel braking force generating device receives brake-fluid pressure from the brake-fluid pressure generating device and causes a braking force to be generated at a fist wheel. A second wheel braking force generating device receives brake-fluid pressure from the brake-fluid pressure generating device and causes braking force to be generated at a second wheel. Further, a brake fluid conduit communicates the brake-fluid pressure generating device with the first and second wheel braking-force generating devices. A brake-fluid pressure adjusting device adjusts brake-fluid pressure applied to the first and second wheel braking-force generating devices in response to a road-surface limit in a braking state of the first and second wheels to optimally adjust a braking state of the first and second wheels. In addition, an increasing device increases brake-fluid pressure applied to other wheels whereat pressure adjustment has not yet been undertaken, to increase the brake-fluid pressure to a level above that generated by the brake-fluid pressure generating device, at a time when adjustment of brake-fluid pressure applied to either the first or the second wheel braking-force generating device by the brake-fluid pressure adjusting device is started.

Alternatively, the vehicle brake apparatus includes a brake-fluid pressure generating device to generate brake-fluid pressure corresponding to driver braking. First, second, third and fourth wheel braking force generating devices receive brake-fluid pressure from the brake-fluid pressure generating device and cause braking force to be generated at the respective wheels. A first brake fluid conduit communicates the brake-fluid pressure generating device with the first and second wheel braking-force generating devices. A second brake fluid conduit communicates the brake-fluid pressure generating device and the third with fourth wheel braking-force generating devices. A brake-fluid pressure adjusting device adjusts brake-fluid pressure applied to the first, second, third, and fourth wheel braking-force generating devices in response to a road-surface limit in a braking state of the first, second, third, and fourth wheels to optimally adjust a braking state of the wheels. Finally, an increasing device increases brake-fluid pressure applied to at least one of the other wheels whereat pressure adjustment has not yet been undertaken, at a time when adjustment of brake-fluid pressure applied to either the first, second, third, or fourth wheel braking-force generating device by the brake-fluid pressure adjusting device is initiated, to increase brake-fluid pressure to a level above that generated by the brake-fluid pressure generating device.

The increasing device may be a containing device disposed outside the brake fluid conduit separately from the brake-fluid pressure generating device and in communication with the several wheel braking-force generating devices. The containing device contains a predetermined quantity of brake-fluid. A discharging device takes in brake fluid from the containing device, discharges brake fluid toward at least one wheel braking-force generating device whereat pressure adjustment has not yet been initiated, and increases brake-fluid pressure applied to the wheel braking force generating device to increase the brake-fluid pressure described above.

Because brake fluid contained in the containing device is utilized, braking force of a wheel whereat adjustment of brake-fluid pressure has not bee initiated can be boosted rapidly without affecting braking operation.

Furthermore, a control valve may be provided in the brake fluid conduit. The control valve assumes a first control state to cause the brake fluid conduit to be in a communicating state and a second control state enabling a predetermined differential pressure to be generated between brake-fluid pressure on the wheel braking-force generating device side and brake-fluid pressure on the brake-fluid pressure generating device side. The control valve is controlled at the second control state when brake fluid is discharged by the discharging device through a discharge port is connected to the brake fluid conduit between the control valve and the wheel braking-force generating device. As a result, brake fluid is not circulated to the brake-fluid pressure generating device side even when the brake fluid is discharged by the discharging device, as long as differential pressure between brake-fluid pressure on the wheel braking-force generating device side and brake-fluid pressure on the brake-fluid pressure generating device side is within the predetermined differential pressure. That is to say, brake fluid discharged by the discharging device does not directly affect the brake-fluid pressure generating device side, and so kickback at the brake pedal is suppressed and the above-described pressure increase can be performed. Additionally, when the first control state is obtained at a time other than when brake fluid is discharged by the discharging device, communication of the brake fluid conduit is in effect, and so circulation of brake fluid to the brake-fluid pressure generating device also can be accomplished without the occurrence of brake pedal kickback.

Additionally, it is preferred that the above-mentioned increasing device be provided with a maintaining device to maintain a pressure increase performed by the discharging device. The discharge device performs the pressure increase by discharging brake fluid generated by the brake-fluid pressure generating device, or by discharging brake fluid released from a wheel braking-force generating device during adjustment of brake-fluid pressure initiated by the brake-fluid pressure adjusting device, toward a wheel braking-force generating device. At the wheel braking-force generating device where brake-fluid pressure adjustment by the brake-fluid pressure adjusting device has not yet been initiated, the brake-fluid pressure applied to the wheel braking-force generating device is increased beyond the brake-fluid pressure generated by the brake-fluid pressure generating device. As a result, substantially maximum braking force is exhibited even more rapidly.

Also, the above maintaining device maintains differential pressure between brake-fluid pressure in the brake fluid conduit extending from a brake-fluid discharging side of the discharging device to the wheel braking-force generating device and brake-fluid pressure at the brake-fluid pressure generating device. Brake-fluid pressure at the brake-fluid pressure generating device is established at a predetermined ratio relative to brake-fluid pressure in the brake fluid conduit extending from a brake-fluid discharging side of the discharging device. Therefore, even when brake fluid is discharged by the discharging device, brake fluid is not circulated to the brake-fluid pressure generating device side, as long as differential pressure between brake-fluid pressure on the wheel braking-force generating device side and brake-fluid pressure on the brake-fluid pressure generating device side is within the predetermined differential pressure. As a result, brake fluid discharged by the discharging device does not directly affect the brake-fluid pressure generating device side, and kickback is suppressed. Additionally, when brake fluid pressure lowered at suitable timing at a time other than when brake fluid is discharged by the discharging device, pressure differential is substantially eliminated. Accordingly, circulation of brake fluid to the brake-fluid pressure generating device also can be accomplished without kickback.

The brake-fluid pressure-adjusting device may include a pressure-increasing control valve for each wheel in the brake fluid conduit to cause the brake fluid conduit to be communicated during nonadjustment of brake fluid pressure, and during pressure-increasing adjustment and to be interrupted during pressure-reducing adjustment. A pressure-reducing control valve for each wheel in a conduit from the brake fluid conduit to the containing device causes the conduit for pressure-reducing use to be communicated during pressure-reducing adjustment, and to be interrupted during pressure-increasing adjustment, and during nonadjustment of brake fluid pressure. Because the pressure-increasing control valve opens the brake fluid conduit connected to the wheel braking-force generating device of the wheel at which adjustment of brake fluid pressure has not been initiated, braking force can be rapidly boosted at that wheel when the discharging device discharges brake fluid to the brake fluid conduit between the respective pressure-increasing control valves and the maintaining device.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 4 is an explanatory diagram of wheel-speed and brake-fluid pressure change during braking in the first embodiment;

DETAILED DESCRIPTION OF THE PREFERRED EMBODIMENTS

First Embodiment

Figure 1:
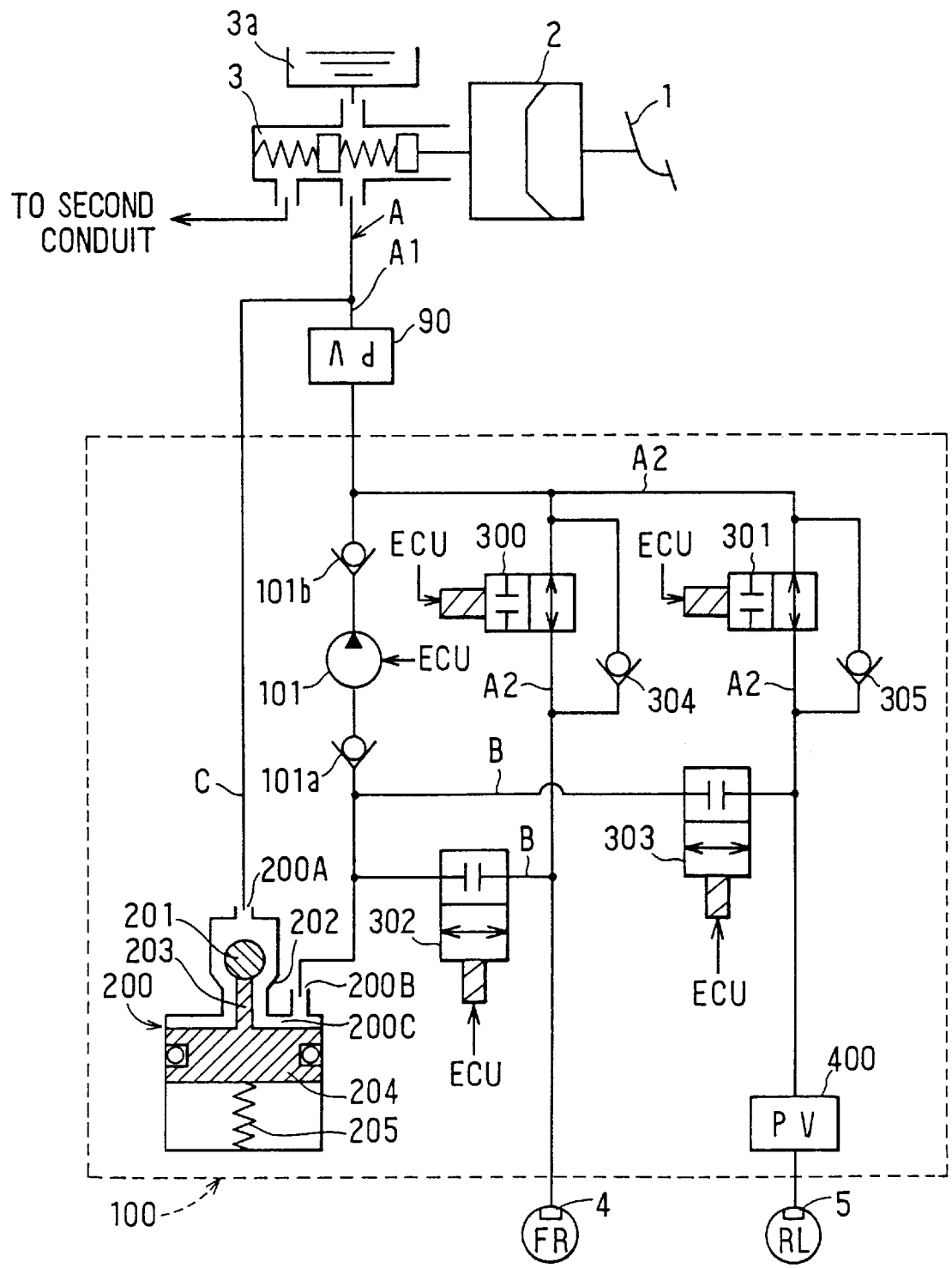
FIG. 1 is a schematic diagram indicating a brake apparatus of a first embodiment.

FIG. 1 is a schematic diagram of a vehicle brake apparatus according to a first embodiment of the present invention. In the present embodiment, the brake apparatus is applied in a vehicle having diagonal brake fluid conduits connecting wheel cylinders of a front-right wheel FR and a rear-left wheel RL and connecting wheel cylinders of a front-left wheel and a rear-right wheel in a front-wheel drive, four-wheeled vehicle.

In FIG. 1, a brake pedal 1 depressed by a driver is connected to a booster 2. Depression force applied to the brake pedal 1 and pedal stroke thereof are conveyed to the booster 2. The booster 2 has at least a first chamber and a second chamber. The first chamber, for example, is utilized as an atmospheric-pressure chamber, and the second chamber is utilized as a vacuum chamber. An intake-manifold vacuum of an engine or a vacuum due to a vacuum pump creates a vacuum in the vacuum chamber. Accordingly, the booster 2 directly boosts the driver's pedal depression between pedal stroke by a pressure differential between the atmospheric-pressure and vacuum chambers. The booster 2 has a push rod or the like to convey the depression force or pedal stroke boosted in this way to a master cylinder 3. The master cylinder 3 generates a master-cylinder pressure PU when the push rod compresses a master piston disposed in the master cylinder 3. Further, the master cylinder 3 is provided with an independent master reservoir 3a to supply brake fluid to the master cylinder 3 or to accumulate excess brake fluid within master cylinder 3.

The master-cylinder pressure PU is conveyed via a proportioning control valve 90 and an antiskid system 100 to a first wheel cylinder 4 for the front-right wheel FR and a second wheel cylinder 5 for the rear-left wheel RL. Description hereinafter is with regard to the front-right wheel FR and the rear-left wheel RL, with it being understood that the front-left wheel and the rear-right wheel are connected by the second brake fluid conduit, are of like structure and function.

Figure 6:
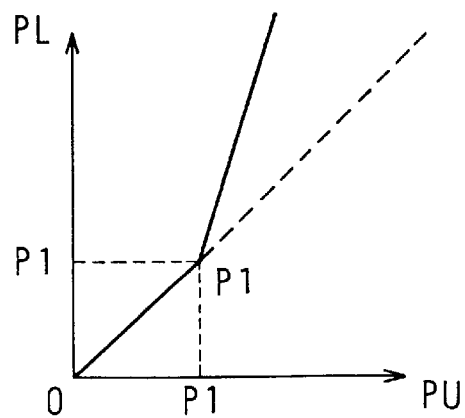
FIG. 6 is an explanatory diagram of functioning of a proportioning control valve.

The proportioning control valve 90 conveys brake fluid pressure to a side downstream thereof with a predetermined attenuation ratio when the brake fluid flows through the valve 90 from the conduit part A1. Herein, because the proportioning control valve 90 is connected in reverse, the wheel-cylinder side is the basic-pressure side, and master-cylinder 3 side is the downstream side. This relationship of pressures is shown in FIG. 6. Basic pressure PL is indicated by the vertical axis, and master-cylinder pressure PU by the horizontal axis. Additionally, in a range below a split-point pressure P1, the master-cylinder pressure PU and the basic pressure PL become equivalent.

The antiskid system 100 is provided with a structure which will be described hereinafter. A conduit A connected to the reverse-connected proportioning control valve 90 is divided into two branches which are connected to the wheel cylinders 4, 5 as second conduit parts A2 thereof. A first pressure-increasing control valve 300 to control increase in brake-fluid pressure to the first wheel cylinder 4 is disposed in one of the second conduit parts A2. A second pressure-increasing control valve 301 to control increase in brake-fluid pressure to the second wheel cylinder 5 is disposed in the other of the second conduit parts A2.

First and second pressure-increasing control valves 300, 301 are structured as a two-way valve of which a communicated/interrupted state can be controlled by an electronic control unit ECU for the antiskid system 100. Accordingly, when the two-way valve is controlled in a communicated state, brake-fluid pressure due to the master-cylinder pressure PU via the proportioning control valve 90 (reversely connected), or brake fluid discharge from a pump 101 can be applied to the respective wheel cylinders 4, 5. During normal braking wherein antiskid control is not executed, the first and second pressure-increasing control valves 300, 301 are controlled to a constantly communicated state. Additionally, safety valves 304, 305 are respectively disposed in parallel to the pressure-increasing control valves 300, 301, and eliminate excess brake-fluid pressure from the wheel-cylinder.

Additionally, a first pressure-reducing control valve 302 and a second pressure-reducing control valve 303 form a two-way valve of which a communicated/interrupted state can be controlled by the system ECU are respectively disposed in conduits B. The conduits B respectively extend from the second conduit parts A2 between the first and second pressure-increasing control valves 300, 301 and the respective wheel cylinders 4, 5 to a second reservoir inlet 200B of a reservoir 200 disposed outside the conduit A. During normal braking, these first and second pressure-reducing control valves 302, 303 are maintained in an interrupted state.

This reservoir 200 has a first reservoir inlet 200A which receives brake fluid from a conduit C having pressure equivalent to the master-cylinder pressure PU. A ball valve 201 is disposed further within the interior of the reservoir 200 than the reservoir inlet 200A. Accordingly, a rod 203 to move the ball valve 201 within a range of a predetermined stroke is provided on an underside of the ball valve 201. A piston 204 interlocking with the rod 203 is provided within a reservoir chamber 200C. The piston 204 slides downwardly when brake fluid has flowed in the reservoir chamber 200C from the first reservoir inlet 200A or the second reservoir inlet 200D, to accumulate brake fluid within the reservoir chamber 200C.

Additionally, when the piston 204 moves downwardly when brake fluid has been accumulated in this way, the rod 203 also moves downwardly in accompaniment thereto, and the ball valve 201 contacts a valve seat 202. Accordingly, when brake fluid corresponding to the predetermined stroke of the rod 203 has been accumulated within the reservoir chamber 200C, the flow of brake fluid between the intake side of the pump 101 and a first conduit part A1 via the conduit C is interrupted by the ball valve 201 and the valve seat 202.

Moreover, the pump 101 is disposed in a position at which safety valves 101a, 101b, are connected at intake and discharge sides of the pump 101. The pump 101 takes in brake fluid between the first and second pressure-reducing control valves 302, 303 and the second reservoir inlet 200B and discharges brake fluid to the second conduit part A2 between the proportioning control valve 90 and the first and second pressure-increasing control valves 300, 301.

Additionally, a proportioning control valve 400 is disposed immediately before the wheel cylinder 5 of the rear-left wheel RL. This proportioning control valve 400 conveys basic pressure of the brake fluid to a downstream side with a predetermined attenuation ratio when the brake fluid is flowing in a normal direction. This causes the front-wheel side to lock during braking operation by slightly reducing rear-wheel brake-fluid pressure during braking in comparison with the front-wheel brake-fluid pressure, to ensure vehicle body stability.

The system unit ECU (not illustrated) controls brake fluid pressure of each wheel cylinder via the first and second pressure-increasing control valves 300, 301, the first and second pressure-reducing control valves 302, 303, and the pump 101.

Brake control by the above-mentioned electronic control unit ECU for the antiskid-system 100 will be described with reference to the flowchart of FIG. 2. The brake control is performed discretely for each wheel. In the description hereinafter, processing with respect to the front-right wheel FR will be described, with it being understood that processing for the other wheels is performed in a like manner.

Figure 2:
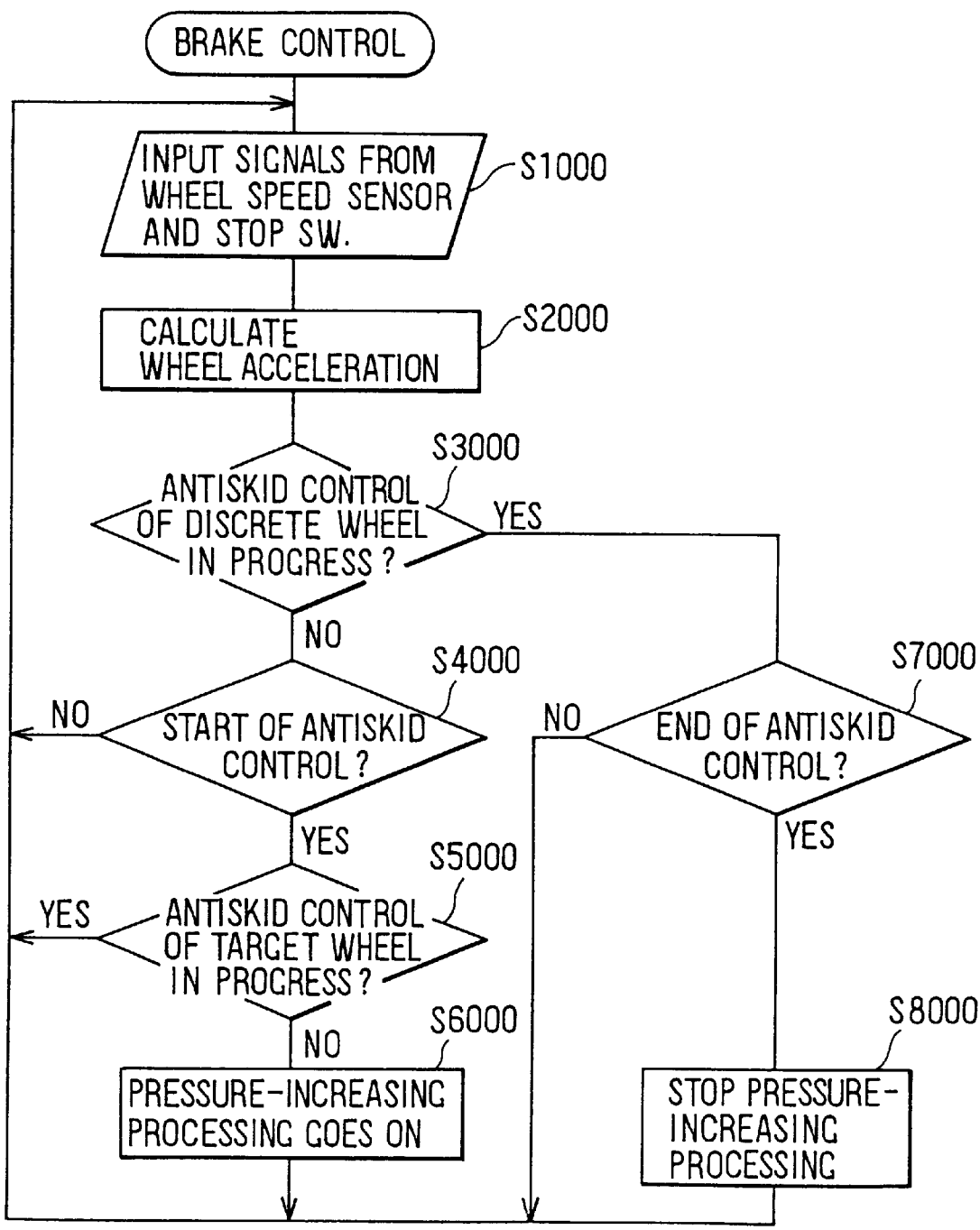
FIG. 2 is a flowchart of brake fluid pressure control processing by an electronic control unit for an antiskid system according to the first embodiment.

When the brake-control processing indicated in FIG. 2 is initiated, the electronic control unit ECU receives respective detection data from a wheel-speed sensor (not illustrated) and a stop switch of the brake pedal 1 (S1000). Subsequently, wheel acceleration is calculated from the wheel-speed sensor detection data (S2000).

Next, it is determined whether the discrete wheel (the front-right wheel FR) is in the midst of antiskid control (S3000). When it is determined that antiskid control is not in progress for the discrete wheel ("NO" in S3000), subsequently it is determined whether a starting condition for antiskid control exists for the discrete wheel (S4000). When an antiskid starting condition does not exist ("NO" in S4000), processing returns to step S1000.

Herein, when the driver has depressed the brake pedal 1, if it is determined based on a state of wheel acceleration or the like that the braking state of the front-right wheel FR has reached or neared a road-surface limit, that is, a starting condition for antiskid control is fulfilled ("YES" in S4000), the processing advances to step S5000. Further, antiskid control through separate processing, although not illustrated, is simultaneously initiated for the front-right wheel FR in response to a "YES" condition at step S4000.

At step S5000, it is determined whether antiskid control has been initiated at the target wheel, herein the rear-left wheel RL. Due to the existence of the proportioning control valve 400, the front wheel reaches a front-wheel lock limit line and antiskid control is initiated at the front-wheel side, as is indicated by point S1 in FIG. 3. Therefore, while antiskid control has been initiated at the front-right wheel FR, antiskid control is usually not initiated at the rear-left wheel RL ("NO" in S5000) at this point.

Consequently, pressure-increasing processing for the target wheel subsequently continues (S6000). That is to say, pressure-increasing processing causes brake fluid to be discharged to the second conduit part A2 via the conduit C and the reservoir 200 by driving the pump 101. Because the proportioning control valve 90 is located between the second conduit part A2 and the first conduit part A1, the second conduit part A2 can be maintained at a higher pressure than the master-cylinder 3 side, as shown in FIG. 6.

At this time, the front-right wheel FR side enters antiskid control, and pressure-reducing control is initially performed. Accordingly, the pressure-increasing control valve 300 is in an interrupted state, whereas for the rear-left wheel RL, the pressure-increasing control valve 301 which has not entered antiskid control is in a communicated state. For this reason, brake-fluid pressure which is at a higher pressure than the master-cylinder 3 side due to discharge of the pump 101 and the existence of the proportioning control valve 90, is applied from the pressure-increasing control valve 301 via the proportioning control valve 400 to the wheel cylinder 5 of the rear-left wheel RL, and braking force for the rear-left wheel RL increases rapidly. That is to say, braking force on the rear-wheel side increases rapidly from the point in time that the front wheel reaches the lock limit, as shown by the solid-line arrow in FIG. 3. As a result, sufficient braking force is generated for the rear wheel as well, and high braking performance can be exhibited before the driver further depresses the brake pedal 1.

Moreover, at step S4000, when it is determined that a condition for starting antiskid control of the discrete wheel does not exist, or when at step S5000 the target wheel has been determined to already be in antiskid control, processing to be executed returns to step S1000 without executing step S6000.

Additionally, at step S3000, when the target wheel has been determined to already be in antiskid control, and determination of antiskid control for the discrete wheel is performed (S7000). When an end condition for antiskid control has not been fulfilled ("NO" is S7000), the processing returns to step S1000. When an ending condition for antiskid control has been fulfilled ("YES" in S7000), pressure-increasing processing for the target wheel is stopped (S8000). That is to say, operation of the pump 101 is stopped, and discharge of brake fluid to the second conduit part A2 is stopped. Simultaneously, antiskid control for the discrete wheel is stopped.

Furthermore, as was described above, processing similar to that shown in FIG. 2 is also performed for the rear-left wheel RL. Moreover, a relationship similar to the foregoing front-right FR and rear-left wheel RL exists also with respect to a combination of the front-left wheel and the rear-right wheel.

According to the first embodiment, when adjustment of the brake-fluid pressure is initiated for any wheel, brake-fluid pressure is increased for other wheels for which adjustment of brake-fluid pressure by the antiskid system 100 has not yet been initiated, as was described above.

Figure 5:
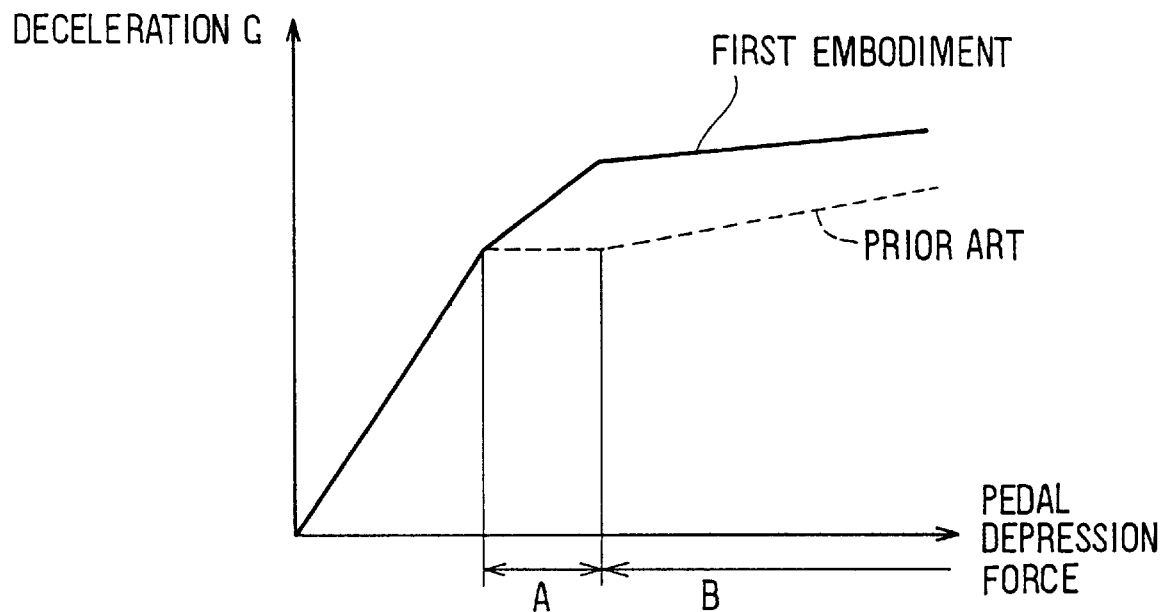
FIG. 5 is an explanatory diagram of change in deceleration G during braking in the first embodiment.

For example, as shown in FIG. 4, the rear-wheel pressure side is increased by brake fluid discharged by the pump 101 from time t1, the beginning of front wheel antiskid control. For this reason, a decrease in the wheel speed of the rear wheels is greater compared to a case wherein pressure is not increased (indicated by broken lines). Consequently, with the first embodiment, deceleration G can be increased rapidly as shown by the graph in FIG. 5 even after the front wheel has entered antiskid control. As a result, braking performance is enhanced.

Additionally, with the first embodiment, brake fluid discharged from the pressure-reducing control valve 302 during antiskid control pressure-reducing adjustment is utilized by the pump 101 via the pressure-increasing valve 301 to increase brake fluid pressure of the wheel cylinder 5 which has not yet entered antiskid control Therefore, the rise in braking force of the rear-left wheel RL is augmented, and braking efficiency is further increased.

Second Embodiment

Figure 7:
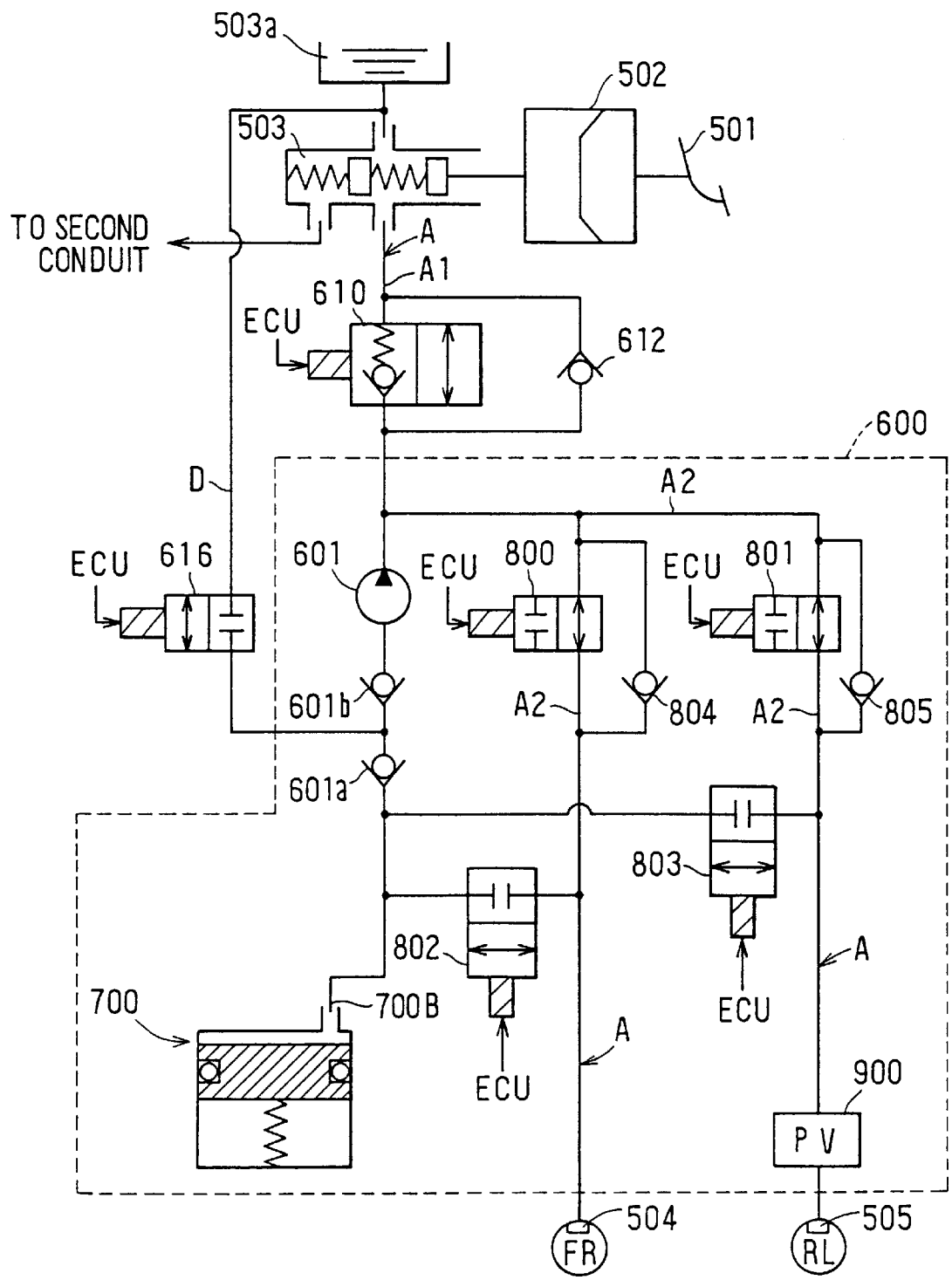
FIG. 7 is a schematic diagram indicating a brake apparatus of a second embodiment.

FIG. 7 is a schematic diagram indicating a second embodiment according to the present invention. Because a brake pedal 501, a booster 502, a master cylinder 503, a master reservoir 503a, a pump 601, pressure-increasing control valves 800, 801, pressure-reducing control valves 802, 803, safety valves 804, 805, a proportioning control valve 900, and wheel cylinders 504, 505 are essentially the same as like components of the first embodiment, detailed description thereof will be omitted. Further, because the structure and function of the apparatus of the present invention corresponding to antiskid control at a front-left wheel and a rear-right wheel is the same as that for the front-right wheel FR and rear-left wheel RL indicated in FIG. 7, description corresponding thereto will be omitted.

The second embodiment differs from the first embodiment in that in the conduit A, a master cutoff valve 610 is utilized rather than the proportioning control valve 90 of the first embodiment between the master cylinder 503 and an antiskid system 600.

Figure 8:
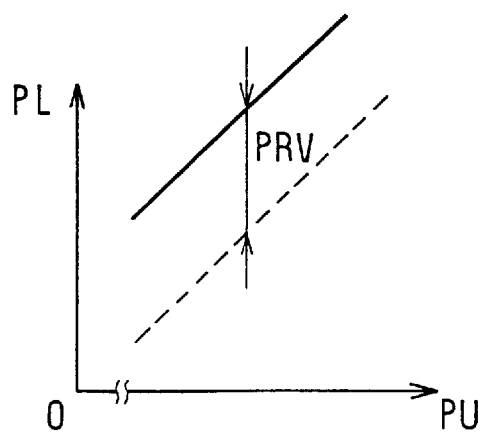
FIG. 8 is an explanatory diagram of functioning of a master cutoff valve.

The master cutoff valve 610 has a port having a differential-pressure valve and a port realizing a communicated state. The master cutoff valve 610 is ordinarily in a communicated state. But, when brake-fluid pressure is being controlled by the antiskid system 600, the master cutoff valve 610 is switched to the port having the differential-pressure valve at a predetermined timing, so that brake fluid pressure of the second conduit part A2 increases to a level higher than brake fluid pressure of the first conduit part A1 as shown in FIG. 8. As a result, a differential-pressure PRV is established between the first conduit part A1 and the second conduit part A2. Switching of the master cutoff valve is performed by an electronic control unit ECU (not illustrated) for the antiskid system 600.

Figure 9:
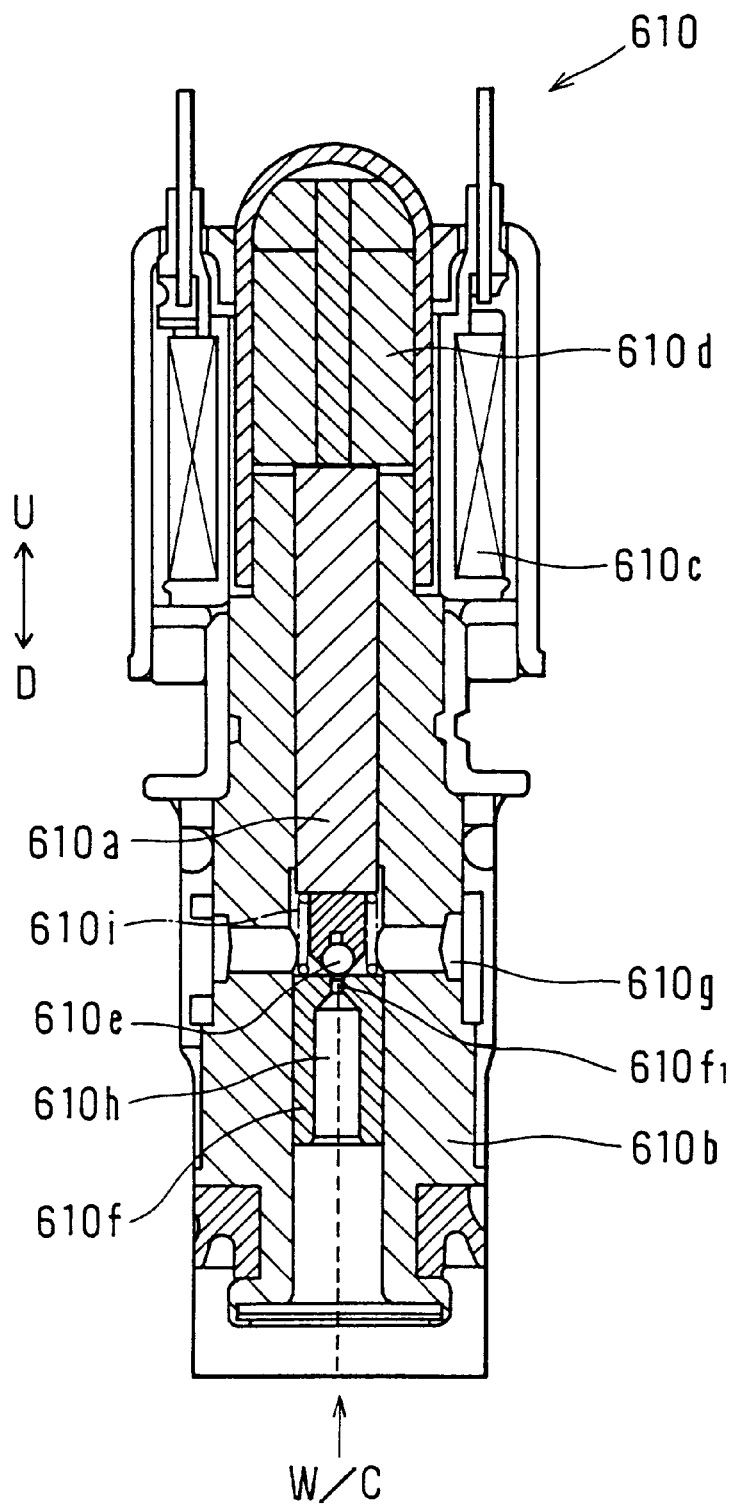
FIG. 9 is a sectional view indicating a structure of the master cutoff valve.
Figure 10:
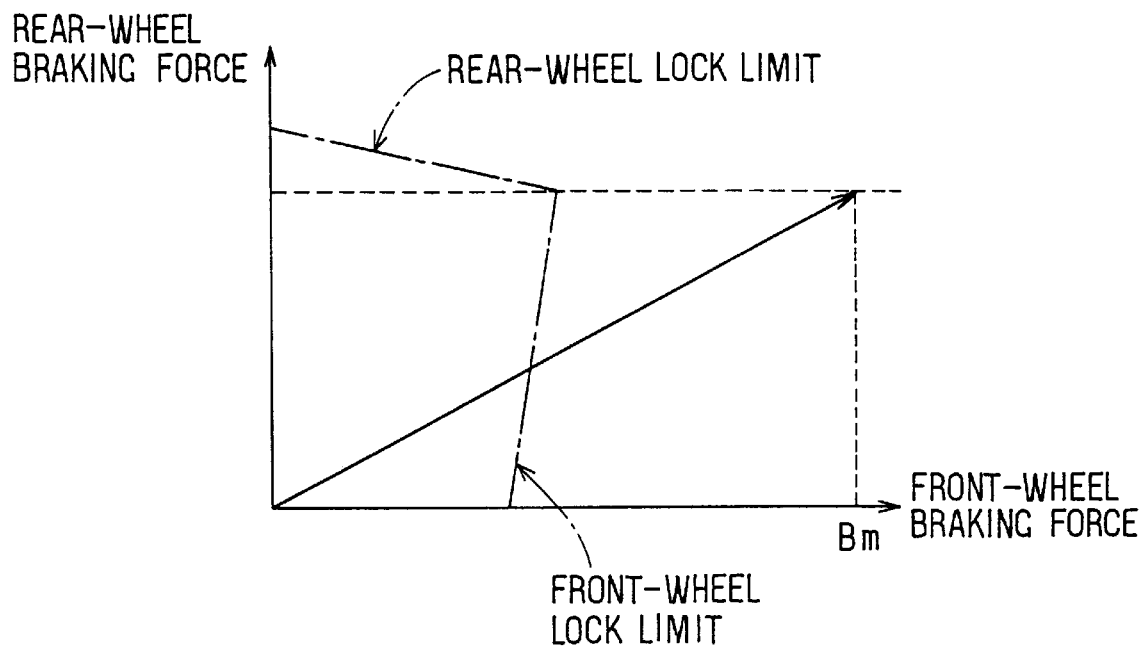
FIG. 10 is an explanatory diagram of front- and rear-wheel braking-force change during braking in a prior art.
Figure 11:
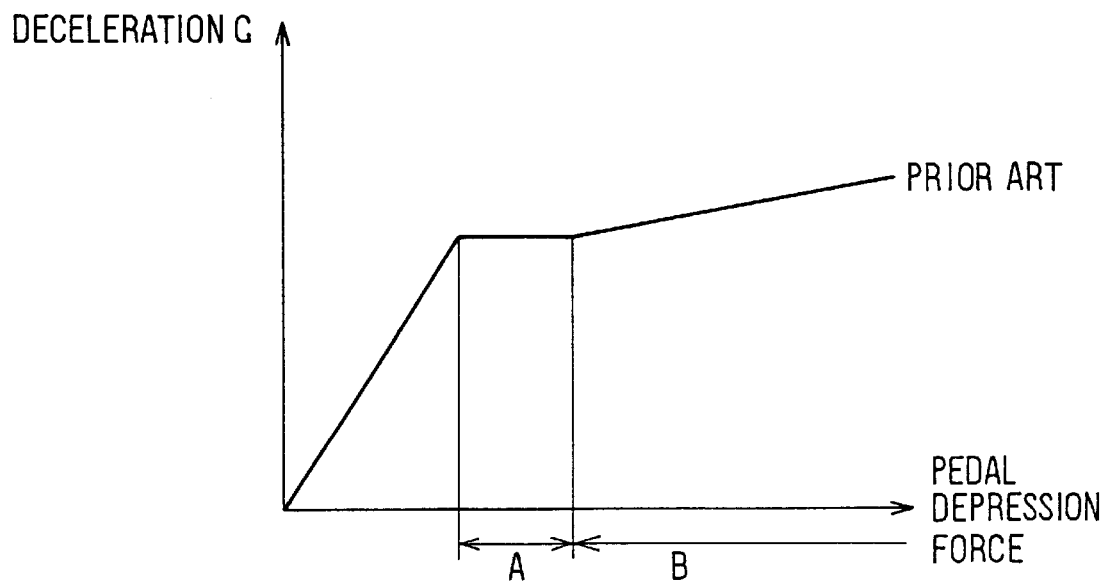
FIG. 11 is an explanatory diagram of change in deceleration G during braking in the prior art.

The master cutoff valve 610, to be described in detail, includes a shaft 610a that is slideable in the directions of arrows U and D, and a guide 610b into which the shaft 610a is matingly inserted. A plunger 610d is connected to a rear end of the shaft 610a, and is driven by an excitation force of a coil 610c to move the shaft 610a, and switches communication and interruption states of the conduit A through communication with a seat 610f having an opening 610f1 of small diameter that accommodates the ball 610e. A spring 610i urges the shaft 610a in the direction of arrow U, as shown in FIG. 9. Accordingly, the master-cylinder side and the wheel-cylinder side are connected by a hydraulic path (indicated by the dotted line) passing through a master-cylinder side communicating hole 610g, a gap formed by the ball 610e and seat 610f, and a wheel-cylinder side communicating hole 610h communicated with the opening 610f1.

Accordingly, the shaft 610a is biased in the arrow-U direction due to the force of the spring 610i so that the hydraulic path is opened. When electricity is supplied to the coil 610c, the shaft 610a counters the force of the spring 610i, and moves in the arrow-D direction, thereby becoming seated in the seat 610f, and closing the hydraulic path.

Further, a depression-increasing valve 612 is disposed in parallel with the master cutoff valve 610. When the brake pedal 501 has been further depressed by the driver, the brake fluid flows into the wheel-cylinder side from the master-cylinder side.

By being structured in this way, even when the second brake-fluid pressure PL has increased with respect to master-cylinder pressure PU, second brake-fluid pressure PL is maintained when the increased pressure is less than or equal to a differential pressure PRV. Additionally, at least the master-cylinder pressure PU can be applied to the wheel cylinders 504, 505 due to the depression-increasing valve 612 being connected, even if the master cutoff valve 610 is stuck at the differential pressure valve position, or the pump 601 has been improperly driven. Additionally, a reservoir 700 disposed outside the conduit A is connected to the brake-fluid intake side of the pump 601. This reservoir 700 accumulates brake fluid when brake fluid has flowed in from a reservoir hole 700B, and causes brake fluid to flow out to an external portion as required.

Additionally, a conduit D from the master reservoir 503a is provided on the intake side of the pump 601, and a two-way intake control valve 616, having a communicated/interrupted state, and controlled by a system ECU, is disposed in the conduit D.

System brake control processing by the above-described ECU is fundamentally the same as the brake-control processing indicated in FIG. 2, but the processing of step S6000 and S8000 with respect to the target-wheel pressure-increasing processing differs as will be described below.

Namely, when the target-wheel pressure-increasing processing turns "on" of step S6000, the master cutoff valve 610 is switched to the port having the differential-pressure valve, the intake control valve 616 is switched to a communicated state, and moreover the pump 601 is operated. As a result, brake fluid is discharged from the master reservoir 503a via the conduit D to the second conduit part A2. Because the master cutoff valve 610 has been switched to the port having the differential-pressure valve between the second conduit part A2 and the first conduit part A1, brake fluid pressure of the second conduit part A2 can be maintained at a pressure higher than the master-cylinder 503 side by a value corresponding to the differential pressure PRV.

Figure 3:
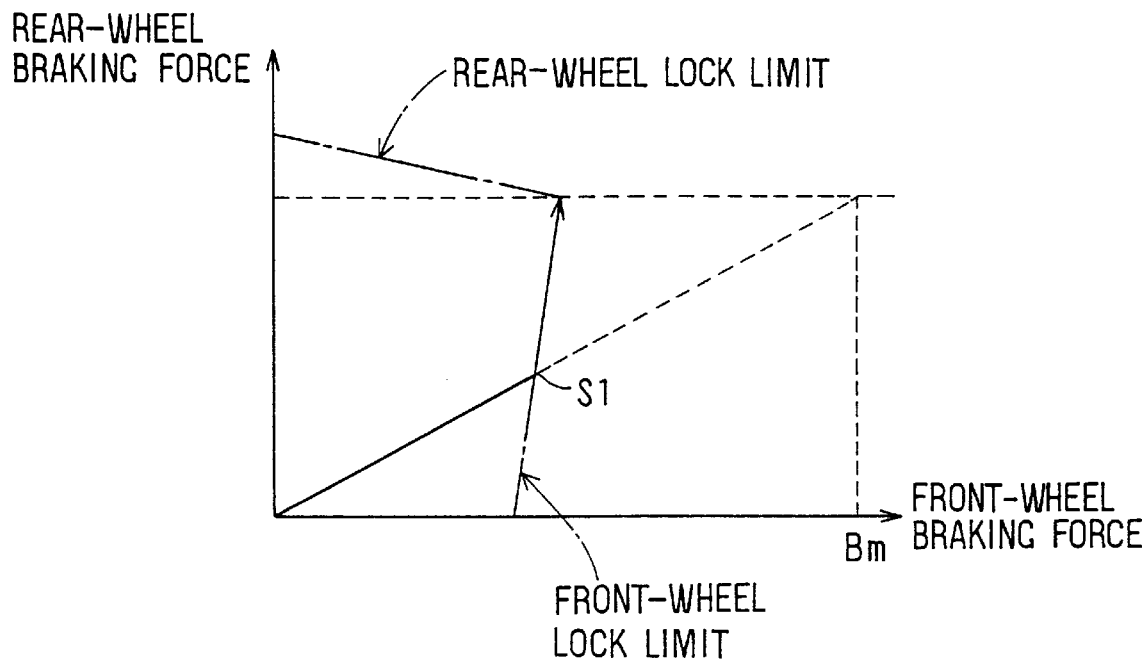
FIG. 3 is an explanatory diagram of front- and rear-wheel braking-force change during braking in the first embodiment.

At this time, the front-right wheel FR enters antiskid control and pressure-reducing control is performed. Therefore, the pressure-increasing control valve 800 is in an interrupted state, whereas the pressure-increasing control valve 801 for the rear-left wheel RL which has not entered antiskid control is in a communicated state. For this reason, brake-fluid pressure which is higher than the pressure on the master-cylinder side is applied from the pressure-increasing control valve 801 via the proportioning control valve 900 to the wheel cylinder 505 of the rear-left wheel RL, and braking force for the rear-left wheel RL increases rapidly. That is to say, braking force on the rear-wheel side increases rapidly from the point in time that the front wheel reaches the lock limit, as is shown in FIG. 3. Therefore, sufficient braking force is generated for the rear wheel as well, and high braking performance can be exhibited without the driver having to depress the brake pedal 501 with great force.

At step S8000, with the target-wheel pressure-increasing processing in an "off" state, the master cutoff valve 610 is switched in a communicated state, the intake control valve 616 is switched in an interrupted state, and moreover the pump 601 is stopped.

Further, as was described above, processing similar to the above-described processing is performed for the rear-left wheel RL as well. Moreover, a relationship similar to the foregoing front-right wheel FR and rear-left wheel RL exists also with respect to a combination of front-left wheel and rear-right wheel.

Additionally, with the second embodiment, brake fluid discharged from the pressure-reducing control valve 802 during the pressure-reducing adjustment of antiskid control is utilized by the pump 601 via the pressure-increasing valve 801 as brake fluid to increase brake fluid pressure of wheel cylinder 505 of the rear-left wheel RL not under antiskid control. Accordingly, the rise in braking force of the rear-left wheel RL is augmented, and braking efficiency is further increased.

Other Embodiments

The above-described several embodiments were related to a diagonal brake fluid conduit braking system in which respective brake fluid conduits connecting the front-right wheel FR and the rear-left wheel RL, and the front-left wheel and the rear-right wheel, in a front-wheel drive, four-wheeled vehicle. However, the present invention is applicable even to a rear-wheel drive vehicle, or to a two-wheeled vehicle, or in any other two-circuit brake system (for example, a front and rear two-circuit system or the like).

I claim:

1. A vehicle brake apparatus, comprising:

a brake-fluid pressure generating device which generates brake fluid pressure in correspondence to a state of brake operation by a driver;

a first wheel braking force generating device which receives brake-fluid pressure from said brake-fluid pressure generating device and generates braking force at a first wheel;

a second wheel braking force generating device which receives brake-fluid pressure from said brake-fluid pressure generating device and generates braking force at a second wheel;

a brake fluid conduit to communicate said brake-fluid pressure generating device and said first and second wheel braking-force generating devices;

a brake-fluid pressure adjusting device which adjusts brake-fluid pressure applied to said first and second wheel braking-force generating devices in response to a road-surface limit to optimally adjust a braking state of said first and second wheels;

a brake assisting device for increasing the brake fluid pressure of one of the first and second wheel braking force generating devices more rapidly than the brake-fluid pressure generating device; and said brake assisting device including a pressure increasing device for increasing brake-fluid pressure applied to said first wheel above that generated by said brake-fluid pressure generating device, when said brake-fluid pressure adjusting device initiates brake-fluid pressure adjustment at said second wheel and before said brake-fluid pressure adjusting device initiates brake-fluid pressure adjustment at said first wheel;

said pressure increasing device likewise for increasing brake-fluid pressure applied to said second wheel above that generated by said brake-fluid pressure generating device when said brake-fluid pressure adjusting device initiates brake-fluid pressure adjustment at said first wheel and before said brake-fluid pressure adjusting device initiates brake-fluid pressure adjustment at said second wheel.

2. A vehicle brake apparatus as recited in claim 1, wherein said pressure increasing device comprises:

a containing device disposed outside said brake fluid conduit from said brake-fluid pressure generating device to said first and second wheel braking-force generating devices, which contains brake fluid of a predetermined amount; and a discharging device which takes in brake fluid from said containing device, discharges brake fluid toward at least one of said first and second wheel braking-force generating devices whereat adjustment of brake-fluid pressure by said brake-fluid pressure adjusting device has not yet been initiated, and increases brake-fluid pressure applied to said at least one of said first and second wheel braking force generating devices to increase brake-fluid pressure generated by said brake-fluid pressure generating device.

3. A vehicle brake apparatus as recited in claim 2, further comprising:

a control valve disposed in said brake fluid conduit, which is switchable between a first control state to cause said brake fluid conduit to be in a communicating state and a second control state allowing generation of a predetermined differential pressure between brake-fluid pressure on a side of said first and second wheel braking-force generating devices and brake-fluid pressure on a side of said brake-fluid pressure generating device, wherein said control valve is controlled at said second control state when discharge of brake fluid is being performed by said discharging device of which a discharge port is connected to said brake fluid conduit between said control valve and said wheel braking-force generating device.

4. A vehicle brake apparatus as recited in claim 2, wherein said brake-fluid pressure-adjusting device comprises:

a pressure-increasing control valve disposed for each wheel in said brake fluid conduit to cause the brake fluid conduit to be communicated during a nonadjustment of brake fluid pressure and during a pressure-increasing adjustment and to be interrupted during a pressure-reducing adjustment;

a pressure-reducing control valve disposed for each wheel in a pressure-reducing conduit extending from said brake conduit to said containing device, said pressure-reducing control valve being operative to cause said pressure-reduction conduit to be communicated during brake-fluid pressure-reducing adjustment and to be interrupted during both brake-fluid pressure-increasing adjustment and nonadjustment, wherein said discharging device discharges brake fluid to said brake fluid conduit between said pressure-increasing control valve and the maintaining device.

5. A vehicle brake apparatus as recited in claim 1, wherein said pressure increasing device comprises:

a discharge device which performs increase of brake fluid pressure by discharging brake fluid generated by the brake-fluid pressure generating device toward one of said first and second wheel braking-force generating devices whereat adjustment of brake-fluid pressure by the brake-fluid pressure adjusting device has not yet been started, in order that the brake-fluid pressure applied to the wheel braking-force generating device is increased to excess brake-fluid pressure generated by the brake-fluid pressure generating device; and a maintaining device which maintains brake fluid pressure increased by said discharge device.

6. A vehicle brake apparatus as recited in claim 5 wherein said maintaining device maintains brake-fluid pressure in a brake fluid conduit extending from a brake-fluid discharging side of said discharging device to said fist and second wheel braking-force generating devices so that brake-fluid pressure at the brake-fluid pressure generating device is attenuated at a predetermined ratio relative to brake-fluid pressure in the brake fluid conduit extending from said brake-fluid discharging side of said discharging device to said first and second wheel braking-force generating devices.

7. A vehicle brake apparatus as recited in claim 1, wherein said increasing device comprises:

a discharging device which increases brake fluid pressure by discharging brake fluid released from one of said first and second wheel braking-force generating devices after brake-fluid pressure adjustment is initiated by the brake-fluid pressure adjusting device, to another of said first and second wheel braking-force generating devices whereat adjustment of brake-fluid pressure by the brake-fluid pressure adjusting device has not yet been initiated, to increase the brake-fluid pressure applied to the wheel braking-force generating device to a level above that generated by the brake-fluid pressure generating device; and a maintaining device which maintains brake fluid pressure increased by said discharging device.

8. A vehicle brake apparatus, comprising:

a brake-fluid pressure generating device which generates brake-fluid pressure in correspondence to a state of brake operation by a driver;

a first wheel braking force generating device which receives brake-fluid pressure from said brake-fluid pressure generating device and generates braking force at a first wheel;

a second wheel braking force generating device which receives brake-fluid pressure from said brake-fluid pressure generating device and generates braking force at a second wheel;

a third wheel braking force generating device which receives brake-fluid pressure from said brake-fluid pressure generating device and generates braking force at a third wheel;

a fourth wheel braking force generating device which receives brake-fluid pressure from said brake-fluid pressure generating device and generates braking force at a fourth wheel;

a first brake fluid conduit which communicates said brake-fluid pressure generating device with said first and second wheel braking-force generating devices;

a second brake fluid conduit which communicates said brake-fluid pressure generating device with said third and fourth wheel braking-force generating devices;

a brake-fluid pressure adjusting device which adjusts brake-fluid pressure applied to each of said first, second, third, and fourth wheel braking-force generating devices in response to a road-surface limit to optimally adjust a braking state of each of said first, second, third, and fourth wheels;

a brake assisting device for increasing the brake fluid pressure of one of the first, second, third and fourth wheel braking force generating devices more rapidly than the brake-fluid pressure generating device;

said brake assisting device including a pressure increasing device which increases, at a time when adjustment of brake-fluid pressure applied to at least one of said first, second, third, and fourth wheel braking-force generating devices by said brake-fluid pressure adjusting device is initiated, brake-fluid pressure applied to at least one of said first, second, third and fourth wheels whereat adjustment of brake-fluid pressure by said brake-fluid pressure adjusting device has not yet been initiated, to increase brake-fluid pressure to a level above that generated by said brake-fluid pressure generating device to thereby enhance braking performance at said at least one of said first, second, third, and fourth wheel braking-force generating devices.

* * * * *